Oct. 17, 1967 W. A. MILOS 3,346,979
COMBINED NEGATIVE AND PHOTOGRAPH CORNER MOUNTING
Filed Aug. 2, 1965

INVENTOR
WALTER A. MILOS
BY Wayne B. Stone Jr.
ATTORNEY

United States Patent Office 3,346,979
Patented Oct. 17, 1967

3,346,979
COMBINED NEGATIVE AND PHOTOGRAPH
CORNER MOUNTING
Walter A. Milos, 552 Fernwood Terrace,
Linden, N.J. 07036
Filed Aug. 2, 1965, Ser. No. 476,403
7 Claims. (Cl. 40—158)

ABSTRACT OF THE DISCLOSURE

The disclosure relates to the formation of a pair of generally similarly shaped flattened pockets lying one on top of the other and separated by a single ply of sheet material. The underlying pocket is adapted to receive one corner of a negative and provide a good frictional grip thereon while the overlying pocket replaces the conventional photograph corner mounting normally supporting one of the corners of the photograph.

---

This invention relates to a combined negative and photograph corner mounting suitable for attachment to an album page or other backing material which, in addition to supporting one corner of a photograph in a conventional manner, will support the negative from which the photograph was made.

The desirability of mounting photographs in an album for accessibility, safekeeping, and purposes of identification is well known and widely practiced. One of the more convenient and best known methods of mounting photographs is through the use of small individual corner mountings which may be attached at any desired position on an album page.

Although it has been suggested that the album page, itself, might be formed with slits or have attached across the width thereof pocket forming folded portions to support the photographs, these prior proposals have not received general public acceptance. In the former case no provision is made for different size photographs or selective placement on the page and in the latter the depth of the pocket necessary to support the photograph partially obscures the same from view. The increased flexibility and convenience afforded by individual corner mountings whereby photographs of varying sizes may be mounted at any desired position on a page for ready viewing and the extremely low cost of the small corner mountings as compared to specially constructed pages has resulted in a much wider use of these mountings than any other means of mounting photographs in an album.

When photographs are retained over long periods of time, the negatives from which the photographs were made frequently become lost or misplaced and, even if the negatives can be found, it is a time consuming task to determine just which negative corresponds to a particular photograph.

Several methods of mounting a photographic negative in underlying relation to its corresponding photograph have been previously proposed. These prior proposals have involved either a modification of the album page, itself, or the attachment thereto of relatively large sheet material portions folded upon themselves to provide for the dual mounting of negative and photograph and have met with the same objections as to lack of convenience, flexibility and expense enumerated above.

It is an object of this invention to provide an extremely simple and inexpensive means of mounting a photographic negative in underlying relation to its corresponding photograph.

It is an important feature of the invention that a negative mounting means including a relatively deep negative corner mounting is secured to or integrated with a smaller generally conventional type photograph corner mounting whereby the advantages in this type mounting, enumerated above, may be retained.

The combined negative and photograph corner mounting of this invention further provides for ready insertion and removal of the negative while affording a good frictional grip on the same sufficient to retain the negative in its desired position under normal conditions of usage and which does not require more than a single negative corner mounting to support the negative.

A very important feature of the invention is that it can easily be incorporated in an existing album merely by removing one of the four conventional corner mounts supporting a photograph and replacing it with the combined corner mounting herein described.

The use of the invention insures that the negative will not be creased and provides, in addition to a ready means of identifying the negative with its corresponding photograph, an area underlying the photograph suitable for written memoranda of the time and place the photograph was made.

The concept of combining a negative mount with a conventional type corner mount is highly desirable from a marketing standpoint since it is merely necessary to include along with a package of conventional photograph corner mounts a suitable number of the combined corner mounts of this invention.

These and other objects are achieved by incorporating, with a conventional type photograph corner mounting, a negative corner mounting in such a manner as to form a pair of generally similarly shaped pockets lying one on top of the other and separated by a single ply of sheet material. The upper pocket is designed to cooperate with a plurality of additional conventional type photograph corner mounts to support a photograph in the usual manner. The underlying pocket is adapted to receive one corner of a negative and provide a good frictional grip thereon due to the construction of the underlying pocket and the increased frictional force exerted on the same by the overlying photograph which is securely supported in the overlying pocket by the cooperating additional conventional corner mounts.

The details of construction and method of forming a combined negative and photograph corner mounting in accordance with the invention will be readily apparent from the ensuing description taken in conjunction with the appended drawing wherein like reference characters represent like parts throughout the several views, in which.

Figure 3:
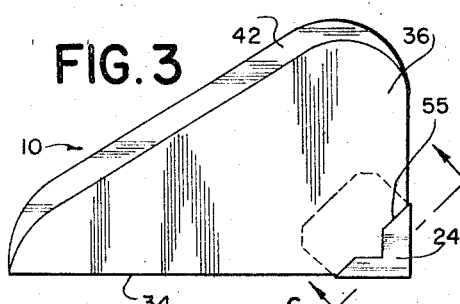
FIGURE 3 is a plan view of the combined photograph and negative corner mounting.

One embodiment of a combined negative and photograph corner mounting 10 is shown in FIGURE 3 and consists of a negative corner mounting 12 secured within the pocket 14 of a generally conventional photograph corner mounting 16.

Figure 1:
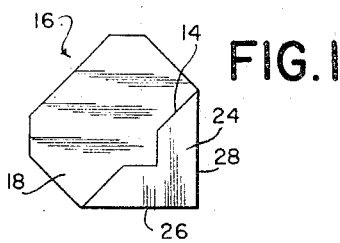
FIGURE 1 is a plan view of a conventional photograph corner mounting.

The conventional corner mounting 16, shown in FIGURE 1, may be formed from sheet material in a manner well known in the art and consists of an underlying ply 18 having adjacent edges 20, 22, at right angles, and a smaller overlapping ply 24 having a generally triangular configuration with the perpendicularly related edges 26, 28 thereof superposed on underlying edges 20, 22. The superposed edges 20, 26 and 22, 28 are closed by a fold of the sheet material from which corner mount 16 is formed and an adhesive or other suitable means of joining overlapped plies of sheet material to form pocket 14 having a closed bottom portion including a right angle. The undersurface of ply 18 is conventionally coated with an adhesive 30 for securing corner mount 16 to a suitable backing material such as an album page or the like.

Figure 2:
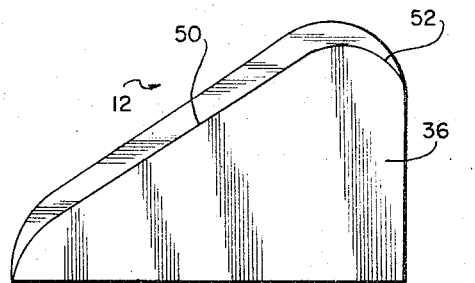
FIGURE 2 is a plan view of a negative corner mounting prior to its assembly with the photograph corner mounting of FIGURE 1.
Figure 4:
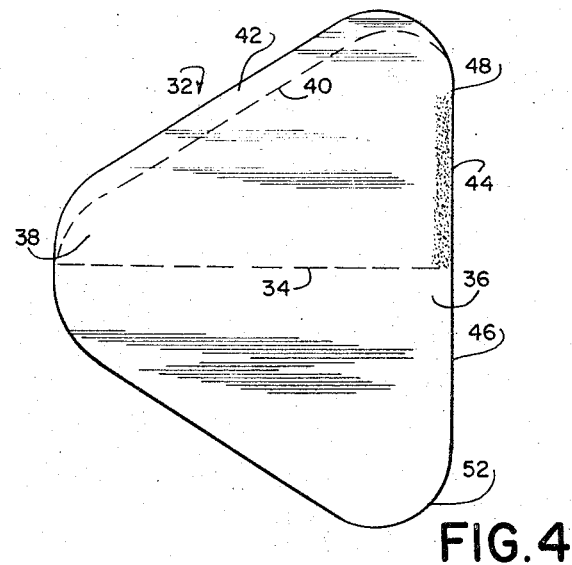
FIGURE 4 is a plan view of a piece of sheet material used in forming the negative corner mount of FIGURE 2 prior to the folding operation.

Although negative mount 12 may be made in a variety of ways, it is herein illustrated as being formed from a single piece of generally triangular shaped sheet material 32 folded upon itself along fold line 34 which divides it into unequal generally triangularly shaped superposed plies 36, 38. It will be noted that overlapping ply 36 is smaller than underlying ply 38 as indicated by dashed line 40 in FIGURE 4 showing the extent to which ply 36 overlaps ply 38. The portion 42 of underlying ply 38 which extends outwardly beyond overlapping ply 36, as shown in FIGURE 2, acts as a guide to facilitate the insertion of a negative into mounting 12. Plies 36 and 38 are closed along their corresponding perpendicularly related edges by fold line 34 and a suitable adhesive 44, applied between superposed edges 46 and 48, to form a generally flattened pocket 50 having a closed bottom portion including a right angle. The adhesive herein illustrated as applied to edge 48 could, of course, be applied to edge 46 of overlapping ply 36 or the edges 46 and 48 could be joined or closed in any other desired manner. Alternatively, the two plies 36 and 38 could be separately cut and joined together by an adhesive or other suitable means along their corresponding superposed edges. Whatever means is used to secure plies 36 and 38 together, the important thing is that the sheet material be so formed as to define a pocket 50 opening outwardly from a closed bottom portion including a right angle so that the same may be received within the pocket of a photograph corner mount which, conventionally, has a similar shape.

It will be noted that adhesive 44 terminates short of the end of overlapped edge 46, as shown in FIGURE 4, which allows corner 52 to be easily flexed away from underlying ply 38. This flexibility of corner 52 taken with the fact that overlapping ply 36 terminates short of underlying ply 38 facilitates the insertion and removal of negatives from negative mount 12 as will become subsequently apparent.

The combined corner mounting is herein illustrated as a lower right hand mount though it is obvious that it may be formed as a lower left hand mount merely by applying adhesive 44 to the opposite face of edge 48 and folding ply 36 into underlying relation relative to ply 38.

Figure 6:
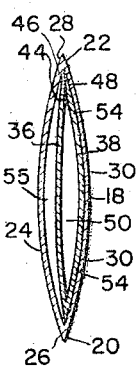
FIGURE 6 is a sectional view taken along the line 6—6 of FIGURE 3 and shown on a greatly enlarged scale for clarity of illustration.

To assemble negative mount 12 with a conventional photograph mount 16 a suitable adhesive 54 is applied either to a portion of the back surface of the negative mount, as viewed in FIGURE 2 adjacent the right angle, or to the upper surface of the underlying ply 18 of the photograph mount. The closed bottom portion of negative mount 12 is then inserted into pocket 14 of photograph mount 16 until fold line 34 and the closed superposed edges 46, 48 abut the corresponding closed edges in mounting 16. FIGURE 6 best illustrates the substantial superposition and closed corresponding perpendicularly related edges of the four plies 18, 38, 36, 24. The completed assembly, shown in FIGURE 3, then includes pocket 50 between plies 36 and 38 of the negative mount and a pocket 55 formed between plies 36 and 24 on the mountings 12 and 16 respectively. It will be readily apparent that pocket 55 is of substantially the same size as the pocket 14 in a conventional photograph corner mount and considerably smaller than pocket 50.

Figure 5:
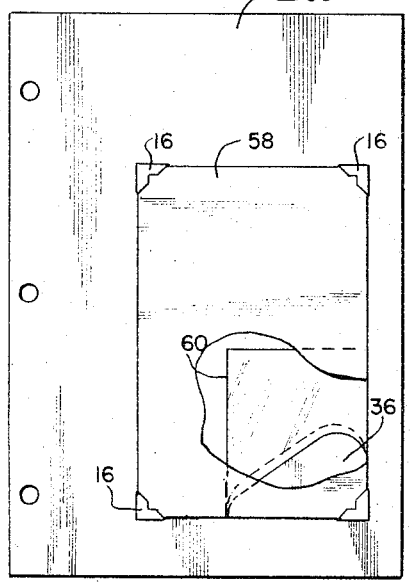
FIGURE 5 is a plan view of an album page showing the mounting of a photograph in overlying relation to a negative in accordance with the invention, the photograph being broken away to better illustrate the underlying structure.

The use of the invention is well illustrated in FIGURE 5 wherein it will be seen that the combined negative and photograph corner mounting 10 is positioned on a backing material herein illustrated as an album page 56 in conjunction with three conventional corner mounts 16 to support a photograph 58 or the like in the usual manner with the lower right hand corner of photograph 58 being received within pocket 55. By removing any two adjacent corners of photograph 58 from its corner mountings, photographic negative 60 may then be inserted into the relatively deep pocket 50 where it will be securely held. The presence of adhesive 44 holding edges 46 and 48 tightly together provides a good frictional engaging means to secure negative 60 within pocket 50 and plies 18 and 24 provide a further reinforcement which tends to keep the negative mount from becoming distorted through frequent usage. The presence of photograph 58 in pocket 55 acts to wedge ply 36 of the negative mount more firmly against negative 60 and increases the frictional forces retaining the negative in pocket 50. Flexible corner 52 permits that portion of negative 60 extending outside pocket 50 to be readily flexed away from the plane of the album page to facilitate its insertion and removal. Since pocket 50 is generally flattened and plies 36 and 38 lie closely adjacent to each other when negative 60 is removed, it is desirable to provide a means for insuring that the negative will be guided smoothly into the pocket. This function is served by the outwardly extending portion 42 which initially receives the negative corner to guide it smoothly into pocket 50 and precludes the possibility of inadvertently wedging the negative corner underneath ply 38. It will be noted that upper surface of ply 36, as viewed in FIGURE 3, affords a convenient surface on which may be written memoranda of the time and place the photograph was taken which is normally concealed by the overlying photograph but which may be readily viewed by removing a corner of the photograph from pocket 55.

In the event it is not desired to utilize a conventional photograph corner mount in the practice of the invention, each of the plies 18, 24 of the photograph mounting and 36, 38 of the negative mounting may be separately cut from a suitable sheet plastic material, stacked together generally in the manner indicated in FIGURES 3 and 6 and their respective edges heat sealed together. Such a method of assembly would eliminate the steps of applying adhesives 44 and 54 and require only that adhesive 30 be applied to the undersurface of ply 16 so that the assembly might be mounted on an album page or the like.

Figure 7:
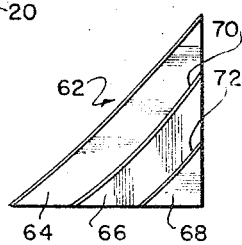
FIGURE 7 is a plan view of a modified form of the invention.

A somewhat different form of the invention is embodied in the combined corner mounting 62 illustrated in FIGURE 7. Mounting 62 consists of three sheet material plies 64, 66, 68 formed as geometrically similar right triangles of different areas and stacked with their right angles superposed. The plies 64, 66 and 68 are stacked in order of decreasing area and each triangular ply 64, 66 is edge joined to its respective overlying ply. The triangular plies may be closed along their respective edges by a fold of material or suitable adhesive, as explained in connection with the embodiment of FIGURE 3, or by a heat sealing operation if the mounting is formed of a suitable sheet plastic.

The pocket 70 thus formed between plies 64 and 66 provides the sole support for a negative in the manner discussed above in connection with pocket 50. Pocket 72 formed between plies 66 and 68 cooperates with additional photograph corner mountings of any conventional type, such as those shown at 16 in FIGURE 5, to support a photograph on an album page in overlying relation to the negative frictionally held in pocket 70.

Combined mounting 62 may be applied to an album page in any desired manner such as by an adhesive coating (not illustrated) applied to the undersurface of triangular ply 64. The use of mounting 62 is substantially identical with that described in connection with mounting 10 and illustrated in FIGURE 5.

Although the invention has been described in connection with the mounting of photographs and negatives in an album, it is apparent that its utility is not so limited and may be used with equal facility in filing systems or the like wherever it is desired to support sheet material members in generally overlying relationship.

I claim:

1. A combined negative and photograph corner mounting comprising plural plies of sheet material each having adjacent perpendicularly related edges and a generally triangular configuration, a lower ply, an intermediate ply overlying said lower ply, an upper ply overlying said intermediate ply, the corresponding perpendicularly related edges of said plies being substantially superposed and closed throughout at least a portion of their lengths to form a pair of superposed pockets opening outwardly from said closed edges, said lower and intermediate plies extending further outwardly from said closed edges than the respective immediately overlying ply, each of said pockets being defined in part by said intermediate ply, and adhesive means on said mounting for securing the same to a backing material.

2. A combined negative and photograph corner mounting comprising at least three superposed sheet material plies each having a generally right triangular configuration, the edges including the right angles of said plies being superposed and closed along at least a portion of their lengths to define generally flattened superposed pockets opening outwardly from said closed edges, the lower and intermediate plies extending further outwardly from the closed edges than the respective immediately overlying ply, and means for attaching said corner mounting to a backing material.

3. A combined negative and photograph corner mounting comprising at least three superposed sheet material plies each having a generally right triangular configuration stacked with their respective shorter legs superposed and closed along at least a portion of the length of said legs, the lower and intermediate ones of said plies extending further outwardly from the closed edges than the respective immediately overlying ply.

4. In combination with a first corner mounting having superposed sheet material plies each having a generally triangular configuration and two edges at right angles, the corresponding edges of said plies being superposed and closed along at least a portion of said edges to form a first generally flattened pocket opening outwardly from said edges, and an adhesive coating on one of said plies, the improvement comprising; a second corner mounting having superposed sheet material plies each having a generally triangular configuration and two edges at right angles, the corresponding edges of said plies being superposed and closed along at least a portion of said edges to form a second generally flattened pocket opening outwardly from said last named edges, and means securing said corner mountings together with all of said edges in substantial superposition.

5. The combination of claim 4 wherein said second corner mounting is substantially larger than said first corner mounting.

6. The combination of claim 5 wherein said edges of said second corner mounting are at least partially positioned within said first pocket.

7. The combination of claim 4 wherein the closed portion of one of said superposed corresponding edges terminates short of its outward end.

References Cited
UNITED STATES PATENTS

| | | | |
|---|---|---|---|
| 1,238,552 | 8/1917 | Mitchell | 40—11 |
| 1,863,430 | 6/1932 | Woerner | 40—158 |
| 2,124,054 | 7/1938 | Corson | 40—11 |
| 3,217,438 | 11/1965 | Hathaway | 40—159 |

EUGENE R. CAPOZIO, *Primary Examiner.*

W. J. CONTRERAS, *Assistant Examiner.*